United States Patent [19]
Bryan, Jr.

[11] 3,741,269
[45] June 26, 1973

[54] TRACTION INCREASING SYSTEM
[76] Inventor: John F. Bryan, Jr., 3212 Mapleleaf Circle, Dallas, Tex. 75233
[22] Filed: Oct. 4, 1971
[21] Appl. No.: 186,080

[52] U.S. Cl. ............................................. 152/208
[51] Int. Cl. .............................................. B60c 1/00
[58] Field of Search .................................. 152/208

[56] References Cited
FOREIGN PATENTS OR APPLICATIONS
1,002,317   8/1965   Great Britain ..................... 152/208

Primary Examiner—James B. Marbert
Attorney—Richards, Harris & Hubbard

[57] ABSTRACT

A vehicular wheel assembly includes a tire comprising circumferentially spaced segments each including a vacuum port. A plurality of valving assemblies are mounted within the tire for actuation upon inward deflection of the tire to connect a vacuum source to each vacuum port when the segment of the tire incorporating the vacuum port is in engagement with a surface. By this means a partial vacuum is maintained between the contact area of the tire and the surface whereby traction between the tire and the surface is markedly increased.

14 Claims, 5 Drawing Figures

TRACTION INCREASING SYSTEM

BACKGROUND AND SUMMARY OF THE INVENTION

This invention relates to a vehicular wheel assembly, and more particularly to apparatus for increasing traction between a vehicle and a surface.

As is well known, the acceleration, cornering, braking and general handling characteristics of a vehicle depend to a large extent upon maintaining traction between the vehicle and whatever surface the vehicle is operated upon. Over the years, various methods of increasing traction have been proposed. These include numerous tire tread designs, aerodynamic structures responsive to air flowing over a vehicle for imposing a downward thrust on the vehicle, and apparatus for establishing a vacuum between a vehicle and a surface. However, notwithstanding the foregoing and other attempts at improving traction, a need exists for a workable system for increasing traction between a vehicle tire and a surface.

The present invention comprises a novel vehicular wheel assembly which functions to increase traction between a vehicle and a surface by maintaining a vacuum under the contact area of a tire. In accordance with the preferred embodiment of the invention, the tread of a vehicle tire comprises circumferentially spaced segments each having a vacuum port formed in it, and structure is provided for establishing a partial vacuum within each vacuum port as its particular segment of the tread comes into engagement with a surface. By this means the tread is drawn tightly into engagement with the surface, whereby traction between the tire and the surface is markedly increased.

DESCRIPTION OF THE DRAWINGS

A more complete understanding of the invention may be had by referring to the following Detailed Description when taken in conjunction with the accompanying Drawings, wherein.

DETAILED DESCRIPTION

Figure 1:
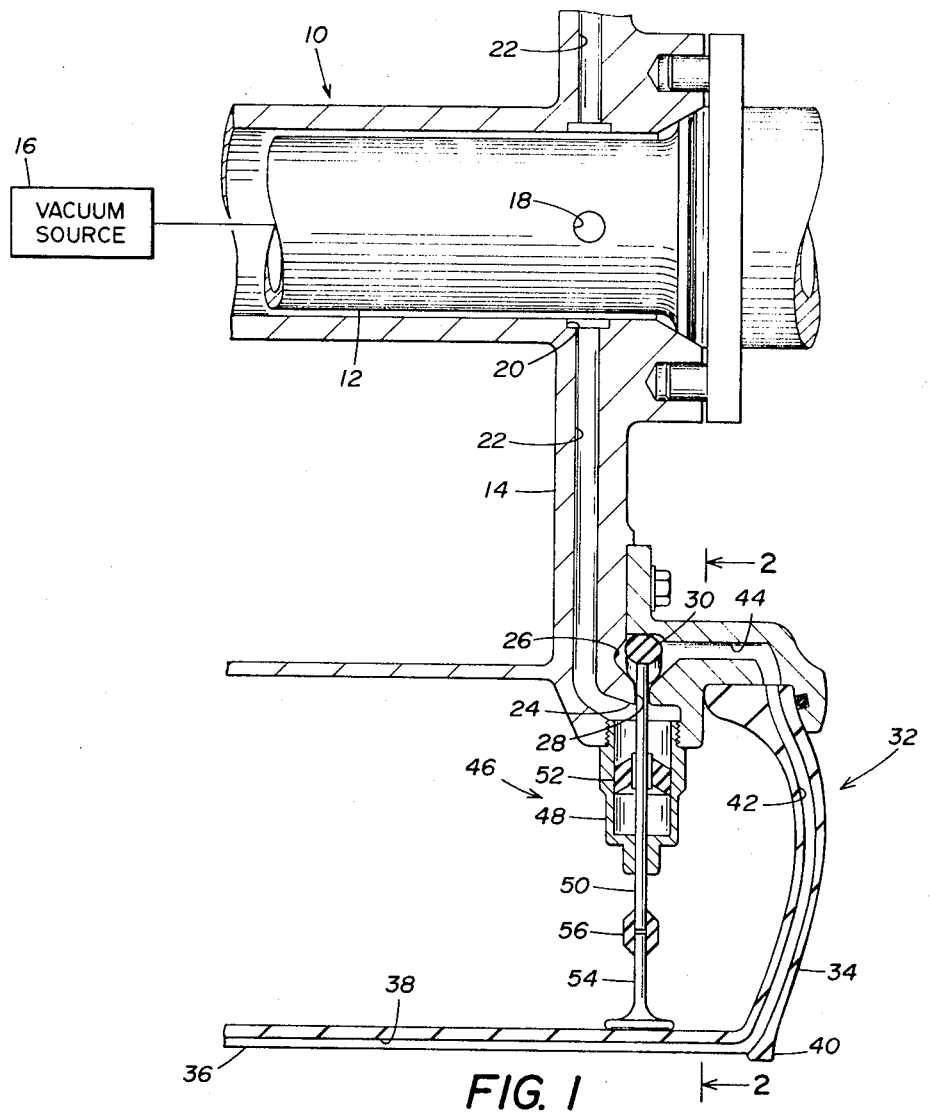
FIG. 1 is a transverse sectional view of a vehicular wheel assembly incorporating a first embodiment of the invention.

Referring now to the Drawings, and particularly to FIG. 1 thereof, there is shown a vehicular wheel assembly 10 comprising a first embodiment of the invention. The vehicular wheel assembly 10 comprises a portion of an automobile or similar vehicle and includes an axle 12 which is rotatably supported and a rim 14 which is supported for rotation with the axle 12. The axle 12 is hollow and is coupled to a vacuum source 16 whereby the interior of the axle 12 is maintained at a negative pressure or partial vacuum of about 10 psi. The axle 12 has a plurality of holes 18 formed in it, and the rim 14 has an annular cavity 20 formed in it in alignment with the holes 18. By this means vacuum from the source 16 is also established in the cavity 20 and in a plurality of circular passageways 22 which extend radially outwardly from the annular cavity 20 through the rim 14.

The passageways 22 connect the vacuum source 16 to an annular passageway 24 which extends entirely around the rim 14 of the vehicular wheel assembly 10. An annular passageway 26 is disposed just inside the passageway 24 and also extends entirely around the rim 14. The passageway 26 is connected to the passageway 24 by a slot 28 but is normally sealed by a resilient ring 30 formed from soft rubber or the like. The configuration of the passageways 24 and 26, the slot 28 and the ring 30 comprises an important feature of the present invention in that by means of the construction shown in the Drawings, the ring 30 functions to seal the slot 28 under the action of three separate and distinct forces, i.e., its own resiliency, the vacuum in the passageway 24, and centrifugal force which occurs when the rim 14 is rotated.

The vehicular wheel assembly 10 further includes a tire 32 that is mounted on the rim 14 by conventional means. The tire 32 comprises a pair of radially extending side walls 34 and an axially extending tread 36 which is connected between the outer edges of the side walls 34. The tread 36 comprises a series of circumferentially spaced segments each having a vacuum port 38 formed in it. A pair of sealing lips 40 are formed along the edges of the tread 36 at the intersection of the tread with the side walls 34 of the tire 32.

The vacuum ports 38 extend entirely across the tread 36 of the tire 32 into communication with passageways 42 formed in the side walls 34 of the tire. The passageways 42 are individual to one of the vacuum ports 38 and extend upwardly into communication with passageways 44 formed in the rim 14. The passageways 44 are also individual to one of the vacuum ports 38 and extend into communication with the annular passageway 26 formed in the rim 14.

A plurality of valving assemblies 46 are mounted within the tire 32 for actuation to connect the vacuum ports 38 to the vacuum source 16. Each valving assembly 46 is individual to one of the vacuum ports 38 and includes a housing 48 which is supported by the rim 14. A rod 50 is supported for sliding movement relative to the housing 48 against the action of an elastomeric member 52 which functions as a combined seal and spring for the valving assembly 46. A foot 54 is secured to one end of the rod 50 by a resilient coupling 56 and is positioned in engagement with the interior of the tread 36 of the tire 32. The opposite end of the rod 50 is positioned in engagement with the resilient ring 30. Thus, upon movement of the rod 50 radially inwardly relative to the rim 14, a portion of the resilient ring 30 is displaced, whereby the vacuum port 38 corresponding to the valving assembly 46 incorporating the rod 50 is connected to the vacuum source 16 through the passageway 42, the passageway 44, the annular passageway 26, the slot 28, the annular passageway 24, the passageways 22, the annular cavity 20, the holes 18, and the axle 12.

Figure 2:
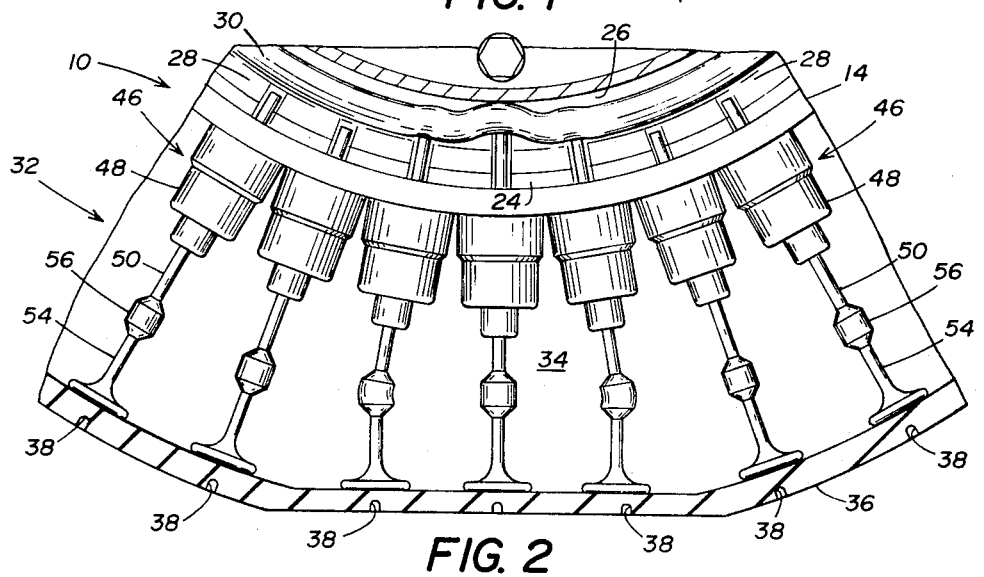
FIG. 2 is a sectional view taken generally along the line 2—2 in FIG. 1.

The operation of the vehicular wheel assembly 10 will be better understood by referring to FIG. 2. The feet 54 of the valving assemblies 46 are retained in engagement with the interior of the tread 36 of the tire 32 by the resiliency of the elastomeric member 52 and by centrifugal force. The combined lengths of the feet 54 and the rods 50 of the valving assemblies 46 is such that the resilient ring 30 is normally positioned to seal the slot 28. Thus, the vacuum ports 38 formed in segments of the tread 36 which are out of engagement with a surface are maintained at atmospheric pressure.

As a particular segment of the tread 36 moves into engagement with a surface it is deflected inwardly due to the weight of the vehicle incorporating the vehicular wheel assembly 10. By this means the foot 54 and the rod 50 of the valving assembly 46 corresponding to the segment are forced inwardly against the action of the elastomeric member 52 and against centrifugal force. As the rod 50 is moved inwardly, it functions to displace a portion of the resilient ring 30 from sealing engagement with the slot 28. By this means a portion of the annular passageway 26 is coupled to the annular passageway 24 through the slot 28. Since the passageway 44 corresponding to the rod 50 that has been displaced inwardly extends into communication with the passageway 26, this action couples the vacuum ports 38 of the particular segment of the tread 36 of the tire 32 to the vacuum source 16.

Each vacuum port 38 remains coupled to the vacuum source 16 so long as its particular segment of the tread 36 remains in contact with the surface. During this period the resilient coupling 56 yields slightly to allow the foot 54 to remain engaged with the interior of the tread 36. As the particular segment of the tread 36 moves out of contact with the surface, the foot 54 and the rod 50 are displaced outwardly by the action of the elastomeric member 52 and by centrifugal force. This permits the portion of the resilient ring 30 corresponding to the particular segment of the tread 36 to re-engage the slot 28, whereby the coupling between the vacuum port 38 of the particular segment of the tread and the vacuum source 16 is broken. Of course, the connection of the vacuum port 38 to the vacuum source 16 is re-established as soon as the particular segment of the tread incorporating the vacuum port has rotated sufficiently to re-engage the surface.

Figure 3:
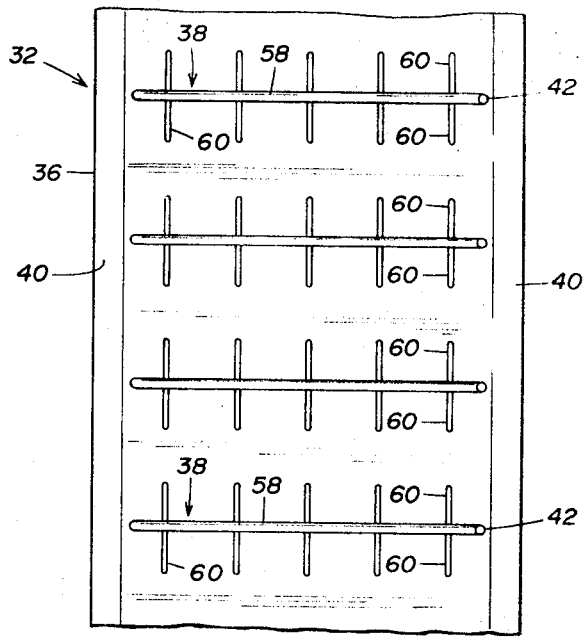
FIG. 3 is an illustration of the tread of the tire of the vehicular wheel assembly shown in FIG. 1.
Figure 5:
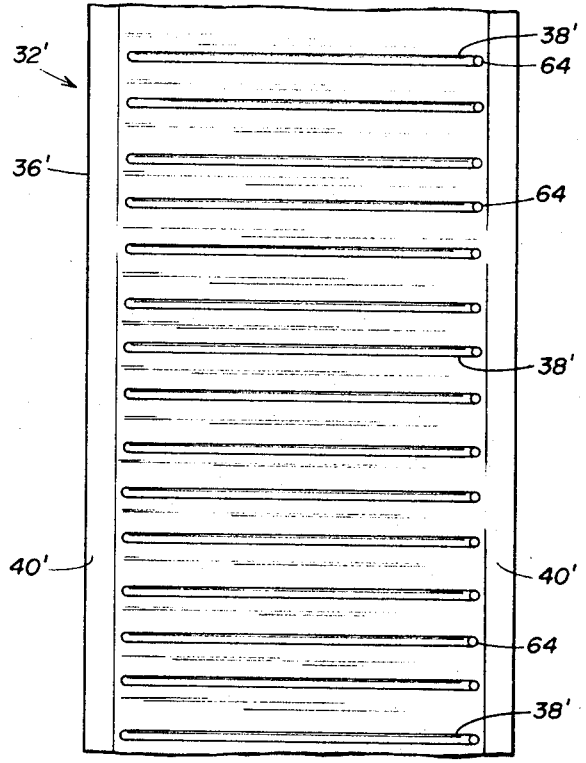
FIG. 5 is an illustration of the tread of the tire of the vehicular wheel assembly shown in FIG. 4.

Referring now to FIG. 3, a portion of the ground engaging surface of the tread 36 of the tire 32 of the vehicular wheel assembly 10 is shown. The tread 36 comprises a series of circumferentially spaced segments each incorporating one of the vacuum ports 38. Each vacuum port 38 in turn comprises a main portion 58 which extends transversely across substantially the entire width of the tread 36 and a plurality of fingers 60 which extend circumferentially of the tread 36. As will be appreciated by those skilled in the art, the shape and the length of the fingers 60 of the vacuum ports 38 may be varied in order to adapt the tire 32 to a particular surface. It will be further appreciated that the fingers 60 of adjacent vacuum ports 38 may be interleaved, if desired.

From the foregoing, it will be understood that in the practice of the present invention the valving assemblies 46 function to establish a partial vacuum in each vacuum port 38 of the tread 36 of the tire 32 as the segment of the tread incorporating the vacuum port comes into engagement with a surface and to establish atmospheric pressure in each vacuum port 38 when the segment of the tread incorporating the vacuum port moves out of engagement with the surface. By this means a partial vacuum is constantly maintained under the contact area of the tire 32. Thus, the tire is held tightly in engagement with the surface by vacuum attraction, whereby traction between the tire and the surface is markedly increased. As will be readily understood, such increased traction results in a vast improvement in the acceleration, cornering, braking and general handling characteristics of a vehicle incorporating the invention.

Figure 4:
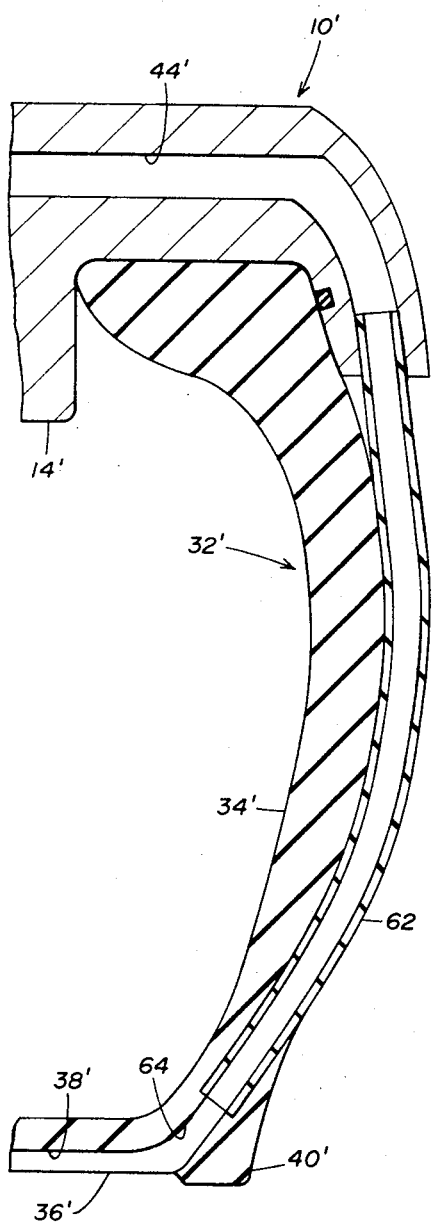
FIG. 4 is a partial transverse sectional view of a vehicular wheel assembly incorporating a second embodiment of the invention.

Referring now to FIG. 4, there is shown a vehicular wheel assembly 10' incorporating a second embodiment of the invention. The vehicular wheel assembly 10' comprises an axle and a rim 14' constructed substantially identically to the axle 12 and the rim 14 shown in FIG. 1. The wheel assembly 10' further comprises a tire 32' which is mounted on the rim 14' by conventional means. The tire 32' comprises radially extending side walls 34' and an axially extending tread 36' which is connected between the outer edges of the side walls 34'.

The tread 36' of the tire 32' has a plurality of vacuum ports 38' formed therein. The second embodiment of the invention differs from the first embodiment of the invention primarily in that the vacuum ports 38' are connected to passageways 44' formed in the rim 14' by means of tubes 62 that extend along the outer surface of the side walls 34' of the tire 32'. The tubes 62 extend into the passageways 44' and into passageways 64 which extend through the extreme outer portions of the side walls 34' to connect the tubes 62 to the vacuum ports 38'.

Referring now to FIG. 6, there is shown a portion of the contact surface of the tread 36' of the tire 32'. In accordance with the second embodiment of the invention, the number of vacuum ports 38' is considerably in excess of the number of valving assemblies. This permits the tubes 62 to be inserted into selected passageways 64 in order to advance or retard the application of vacuum to the contact area of the tire 32'. By this means the tire 32' may be adapted to the requirements of particular surfaces. Other means of advancing and retarding the application of vacuum to the contact area of the tires will readily suggest themselves to those skilled in the art.

From the foregoing, it will be understood that in accordance with the present invention, a vehicular wheel assembly comprises vacuum ports formed in the tread of a tire, a source of vacuum, and valving structure for connecting the source of vacuum to each vacuum port as the segment of the tread of the tire incorporating the vacuum port engages a surface. By this means a vacuum is maintained under the contact area of the tire, whereby traction between the tire and the surface is markedly increased. This in turn results in improved acceleration, cornering, braking and general handling characteristics in a vehicle having vehicular wheel assemblies incorporating the present invention.

Although preferred embodiments of the invention have been illustrated in the accompanying Drawings and described in the foregoing Detailed Description, it will be understood that the invention is not limited to the embodiments disclosed, but is capable of rearrangement, modification, and substitution of parts and elements without departing from the spirit of the invention.

What is claimed is:

1. A method of increasing traction between a vehicle tire and a surface comprising continuously connecting a source of vacuum to the contact area of the tire and thereby maintaining a partial vacuum between the contact area of the tire and the surface.

2. The traction increasing method according to claim 1 wherein the tire comprises a plurality of circumferentially spaced segments each including a vacuum port and wherein the vacuum establishing step is carried out by connecting the source of vacuum to each vacuum port as the segment comes into engagement with the surface.

3. The method of increasing traction according to claim 2 wherein the vacuum establishing step is carried out by establishing a vacuum in each vacuum port in response to inward deflection of its segment of the tire.

4. In a vehicle of the type including wheel assemblies which support the vehicle for movement along a surface, the improvement comprising:
   a source of vacuum;
   tires for the wheel assemblies each including radially extending side walls and a tread extending axially between the side walls, said tread comprising a series of circumferentially spaced segments each having a vacuum port formed therein; and
   means connecting the source of vacuum to the vacuum port of each segment when the segment is in contact with the surface and thereby continuously maintaining a partial vacuum under the contact area of the tire.

5. The improvement according to claim 4 wherein the vacuum establishing means is responsive to enagement of each segment with the surface to connect the vacuum port of the segment with the source of vacuum and is responsive to disengagement of each segment from the surface to disconnect the vacuum port of the segment from the source of vacuum.

6. The improvement according to claim 5 further including means for selectively varying the timing relationship between the operation of the vacuum establishing means and the engagement and disengagement of each segment with the surface.

7. The improvement according to claim 4 further including valving means responsive to inwardly deflection of each segment for connecting the source of vacuum to the vacuum port of the segment.

8. The improvement according to claim 4 wherein the vacuum establishing means includes valving means mounted within the tire for actuation by the interior of the tread of the tire to control the connection of the vacuum source to the vacuum ports of the tire.

9. A vehicular wheel assembly comprising:
   axle means;
   a rim supported for rotation with the axle means;
   a tire supported on the rim and including a surface engaging tread comprising circumferentially spaced segments each having a vacuum port formed in it;
   a source of vacuum;
   a plurality of passageways each extending from the source of vacuum to the vacuum port of one of the segments of the tread of the tire and each including normally closed valving means; and
   means for opening the normally closed valving means of the passageway extending to the vacuum port of each segment of the tread of the tire as the segment moves into engagement with a surface and for closing the valving means as the segment moves out of engagement with the surface.

10. The vehicular wheel assembly according to claim 9 wherein a portion of each of the passageways extends through the rim and wherein the valving means of each passageway is supported by the rim.

11. The vehicular wheel assembly according to claim 10 wherein the means for opening and closing the valving means comprises a member extending from the valving means into engagement with the tire for actuation in response to inward deflection of the tread of the tire upon contact between the tread and the surface.

12. The vehicular wheel assembly according to claim 11 wherein the tire includes side walls which extend radially from the rim to the tread and wherein each passageway further includes a portion extending through one of the side walls of the tire.

13. The vehicular wheel assembly according to claim 11 wherein the tire further includes side walls which extend radially from the rim to the tread and wherein each passageway further includes a tube extending along one side wall of the tire from the portion of the passageway formed in the rim to the vacuum port of the segment of the tread corresponding to the passageway.

14. The vehicular wheel assembly according to claim 10 wherein the valving means of the passageways comprises a passageway extending circumferentially around the rim, a resilient ring mounted in the circumferentially extending passageway and biased outwardly therein, an opening from the passageway into the circumferentially extending passageway which is normally sealed by the resilient ring, and means for deflecting the resilient member inwardly to open the opening between the passageway and the circumferentially extending passageway.

* * * * *